(12) United States Patent
Dogan et al.

(10) Patent No.: US 10,362,893 B2
(45) Date of Patent: Jul. 30, 2019

(54) CAPSULE HOLDER FOR A BEVERAGE PREPARATION MACHINE

(71) Applicant: NESTEC S.A., Vevey (CH)

(72) Inventors: Nihan Dogan, La Croix-sur-Lutry (CH); Frederic Doleac, Vaux et Chantegrue (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/395,542

(22) PCT Filed: Apr. 8, 2013

(86) PCT No.: PCT/EP2013/057311
§ 371 (c)(1),
(2) Date: Oct. 20, 2014

(87) PCT Pub. No.: WO2013/160091
PCT Pub. Date: Oct. 31, 2013

(65) Prior Publication Data
US 2015/0056352 A1   Feb. 26, 2015

(30) Foreign Application Priority Data
Apr. 24, 2012 (EP) .................... 12165363

(51) Int. Cl.
*A47J 31/36* (2006.01)
*A47J 31/40* (2006.01)
(52) U.S. Cl.
CPC ......... *A47J 31/407* (2013.01); *A47J 31/3628* (2013.01)

(58) Field of Classification Search
CPC .. A47J 31/407; A47J 31/3628; A47J 31/3695; A47J 31/3623; A47J 31/0678; A47J 31/0642
USPC ..... 99/295, 288, 289 R, 275, 280, 279, 283, 99/495
See application file for complete search history.

(56) References Cited

U.S. PATENT DOCUMENTS

2003/0217644 A1* 11/2003 Jarisch ............... A47J 31/3695
99/279
2004/0250686 A1* 12/2004 Hale ................... A47J 31/0673
99/295
2005/0066819 A1   3/2005 Cooke
(Continued)

OTHER PUBLICATIONS

Japanese Office Action for Japanese Patent Application No. P2015-507450 dated May 30, 2017.
(Continued)

*Primary Examiner* — Tu B Hoang
*Assistant Examiner* — Alba T Rosario-Aponte
(74) *Attorney, Agent, or Firm* — K&L Gates LLP (57) ABSTRACT

The present invention is directed to a capsule holder (8) for holding a closed capsule (9) in a beverage preparation machine (1), said capsule containing a beverage precursor ingredient, said machine being able to inject a fluid under pressure through a wall (11) of said capsule inside the latter such that said fluid and said precursor ingredient mix to make a beverage, said capsule holder (8) comprising a cup-shaped body (12) adapted to retain and hold said capsule, a handle (13), and guide means for removably inserting said capsule holder within said machine, wherein said capsule holder (8) further comprises pressure-releasing means (15) for releasing fluid pressure inside said capsule.

7 Claims, 12 Drawing Sheets

(56) References Cited

U.S. PATENT DOCUMENTS

| | | | |
|---|---|---|---|
| 2010/0037779 A1 | 2/2010 | Pecci et al. | |
| 2010/0064899 A1* | 3/2010 | Aardenburg | A47J 31/3633 99/295 |
| 2010/0083843 A1* | 4/2010 | Denisart | A47J 31/3695 99/295 |
| 2010/0116142 A1* | 5/2010 | Versini | B65D 85/8043 99/295 |
| 2010/0300299 A1* | 12/2010 | Epars | A47J 31/3623 99/288 |
| 2012/0052164 A1* | 3/2012 | Doleac | A47J 31/407 426/112 |

OTHER PUBLICATIONS

English Translation of Japanese Office Action for Japanese Patent Application No. P2015-507450 dated May 30, 2017.

* cited by examiner

CAPSULE HOLDER FOR A BEVERAGE PREPARATION MACHINE

CROSS REFERENCE TO RELATED APPLICATIONS

The present application is a National Stage of International Application No. PCT/EP2013/057311, filed on Apr. 8, 2013, which claims priority to European Patent Application No. 12165363.8, filed Apr. 24, 2012, the entire contents of which are being incorporated herein by reference.

FIELD OF THE INVENTION

The present invention concerns a capsule holder for holding an ingredient capsule, for use in a beverage preparation machine.

BACKGROUND OF THE INVENTION

Beverage preparation machines are well known in the food industry and consumer goods area. Such machines allow a consumer to prepare at home a given type of beverage, for instance a coffee-based beverage, e.g. an espresso or a brew-like coffee cup.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules. In the following, it will be considered that the beverage machine is a beverage preparation machine working with a rigid or semi-rigid capsule.

The machine preferably comprises a receptacle for accommodating said capsule and a fluid injection system for injecting a fluid, preferably water, under pressure into said capsule. Water injected under pressure in the capsule, for the preparation of a coffee beverage, is preferably hot, that is to say at a temperature above 70° C. However, in some particular instances, it might also be at ambient temperature, or even at a chilled temperature. The pressure inside the capsule chamber during extraction and/or dissolution of the capsule contents is typically about 1 to about 8 bar for dissolution products and about 2 to about 12 bar for extraction of roast and ground coffee. The present invention could also encompass the so-called "brewing" process of beverage preparation particularly for tea and coffee. Brewing involves a time of infusion of the ingredient by a fluid (e.g. hot water), whereas the extraction or dissolution preparation process allows a consumer to prepare a beverage, for instance coffee, within a few seconds.

Generally, in the following specification, the term "brewing" of an ingredient by a fluid, is meant to encompass extraction of a powdered edible material such as for instance roast and ground powdered coffee, or dissolution of edible soluble material such as for instance soluble tea or coffee, milk, cocoa mixes, or infusion of an edible material with an infusion fluid under very low relative pressure, or atmospheric pressure, for a longer time than that required for extraction or dissolution, for instance infusion of tea leaves by hot water.

The principle of extracting and/or dissolving the contents of a closed capsule under pressure is known and consists typically of confining the capsule in a receptacle of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule. Capsules allowing the application of this principle have already been described for example in applicant's European patent no EP 1 472 156 B1, and in EP 1 784 344 B1.

Machines allowing the application of this principle have already been described for example in patents CH 605 293 and EP 242 556. According to these documents, the machine comprises a receptacle for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

The machine further comprises a fluid tank—in most cases this fluid is water—for storing the fluid that is used to dissolve and/or infuse and/or extract under pressure the ingredient(s) contained in the capsule. The machine comprises a heating unit such as a boiler or a heat exchanger, which is able to warm up the water used therein to working temperatures (classically temperatures up to 80-90° C.). Finally, the machine comprises a pump element for circulating the water from the tank to the capsule, optionally though the heating unit. The way the water circulates within the machine is e.g. selected via a selecting valve means, such as for instance a peristaltic valve of the type described in applicant's European patent application EP 2162653 A1.

When the beverage to be prepared is coffee, one interesting way to prepare the coffee is to provide the consumer with a capsule containing roast and ground coffee powder, which is to be extracted with hot water injected therein.

Capsules have been developed for such an application, which are described and claimed in applicant's European patent EP 1 784 344 B1, or in European patent application EP 2 062 831.

In short, such capsules typically comprise:
- a hollow body and an injection wall which is impermeable to liquids and to air and which is attached to the body and adapted to be punctured by e.g. an injection needle of the machine,
- a chamber containing a bed of roast and ground coffee to be extracted,
- an aluminum membrane disposed at the bottom end of the capsule, closing the capsule, for retaining the internal pressure in the chamber, the membrane being associated with piercing means for piercing dispensing holes in the aluminum membrane when the internal pressure inside the chamber reaches a certain pre-determined value,
- optionally, means configured to break the jet of fluid so as to reduce the speed of the jet of fluid injected into the capsule and distribute the fluid across the bed of substance at a reduced speed. It is often important for the user to know when the water level in the machine tank is too low to prepare a full beverage.

In many instances, the capsules for use in beverage preparation machines are closed capsules. Such closed capsules are interesting because they protect the ingredient contained therein from ambient gas and moisture and allow long conservation time. Typically, such closed capsules are made from gas and/or moisture impermeable material and feature a rigid or semi-rigid body having a one of its walls—for instance the top wall—made from a membrane which is to be pierced by the fluid injection needle of the beverage preparation machine. When liquid is injected in the capsule compartment, a pressure is built up, which serves as an extraction means for extracting ingredients contained inside the capsule through a dispensing wall of the capsule—typically the bottom wall—.

Figure 12:
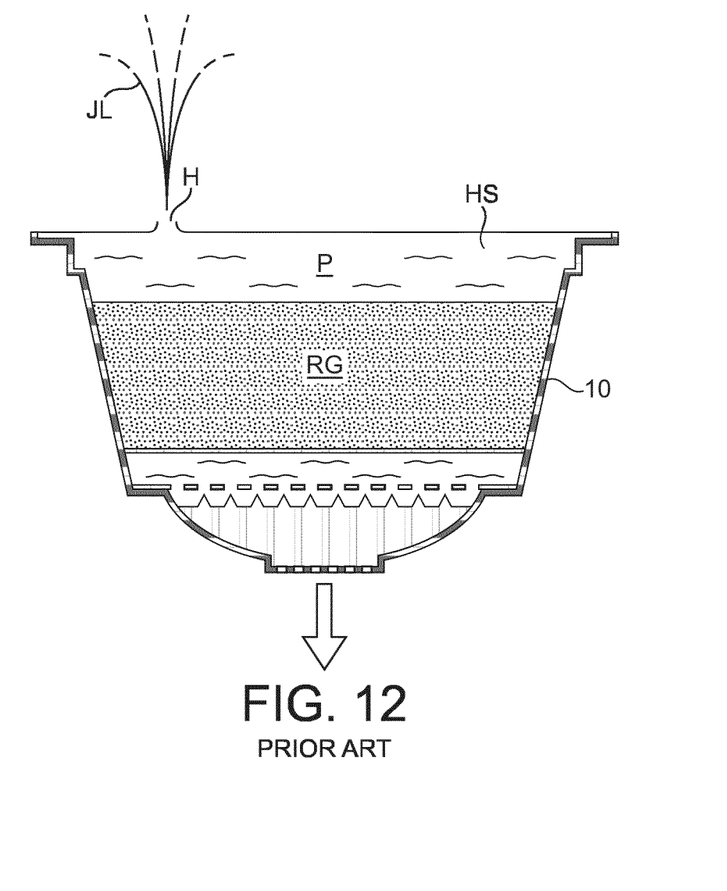
FIG. 12 is a schematic side view showing a prior art capsule with fluid backflow escaping from the top membrane (whale effect).

In prior art capsules, when the fluid injection needle of the machine is removed from the capsule, after the beverage has been prepared and dispensed, the capsule top membrane is pierced and a hole "H" remains as illustrated in FIG. 12. However, in such a case, the extraction fluid pressure "P" remains at least partly in the capsule compartment.

In case the capsule contains soluble ingredient to extract, the capsule compartment generally comprises one single portion, and the residual fluid pressure is distributed across the compartment volume.

In all cases, due to the residual pressure P which remains inside the capsule compartment after the capsule has been used, a jet of liquid "JL"—often referred to as "whale effect"—can spray out of the capsule top membrane, through the hole pierced by the machine needle. Such a whale effect is represented in FIG. 12. Although such a phenomenon occurs randomly and very infrequently, it is undesirable because hot liquid splashing out is messy. Moreover, in case said liquid is water mixed with an ingredient such a leakage of liquid from the capsule top membrane is also undesirable for a cleanliness point of view as it could create some bacteria growth around or inside the machine, which forces the consumer to spend time cleaning the machine and its surroundings after usage.

It is therefore one main objective of the present invention to provide a solution for beverage preparation system which prevents the so-called "whale effect" described above.

SUMMARY OF THE INVENTION

The objectives set out above are met with a capsule holder for holding a closed capsule in a beverage preparation machine, said capsule containing a beverage precursor ingredient, said machine being able to inject a fluid under pressure through a wall of said capsule inside the latter such that said fluid and said precursor ingredient mix to make a beverage, said capsule holder comprising a cup-shaped body adapted to retain and hold said capsule, a handle, and guide means for removably inserting said capsule holder within said machine, characterized in that said capsule holder further comprises pressure-releasing means for releasing fluid pressure inside said capsule.

The pressure-releasing means can be automated and actuated by the machine, or alternatively, they can be manually operated by the user.

In a highly preferred embodiment of the present invention, the pressure-releasing means comprise piercing means adapted to pierce at least one channel through a wall of the capsule.

In that case, said piercing means more preferably comprise a pin element movably linked to a rotationally movable handle through a cam element attached to, or integrally formed with, said handle, such that said pin element is slidable substantially perpendicularly relative to a capsule wall surface when a rotation movement is applied to said handle, said pin element being movable between:
 a retracted position wherein said pin does not protrude from the internal surface of the cup-shaped body, and
 an extended position wherein said pin protrudes from the internal surface of the cup-shaped body so as to be able to perforate a channel through a capsule wall.

Advantageously, the cam element is spring-mounted, such that when no force is applied to the handle, the pin element is in its retracted position.

Also preferably, the piercing element is located adjacent to a side wall of the capsule.

The present invention is also directed to a beverage preparation machine comprising:
 a base with a fluid reservoir, a fluid conveying system having a fluid pump and fluid pipes, optionally a fluid heating element, and a brewing head adapted to receive an ingredient-containing capsule and adapted to inject a fluid under pressure into said capsule to prepare a beverage by mixing said ingredient and said fluid, and
 a capsule holder according to the invention described above.

Last but not least, the present invention is directed to a process for preparing a beverage with a beverage preparation machine as described previously, said process comprising the steps of, in order:
 (i) placing an ingredient-containing capsule in a capsule holder according to the invention, described here before,
 (ii) inserting said capsule holder into the brewing head of the beverage preparation machine,
 (iii) operating said machine such that fluid is injected inside said capsule under pressure through a channel pierced through a capsule wall, said injected fluid being mixed with the ingredient contained in the capsule to prepare a beverage, and dispensing said beverage into a receiving container,
 characterized in that said process further comprises a step of operating pressure releasing means of the capsule holder to release residual fluid pressure inside the capsule, before opening the brewing head of the machine and taking said capsule out of the latter.

In a highly preferred embodiment of the present invention, the operation of said pressure-releasing means comprises piercing at least one channel through a wall of the capsule, preferably through a side wall of the capsule.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
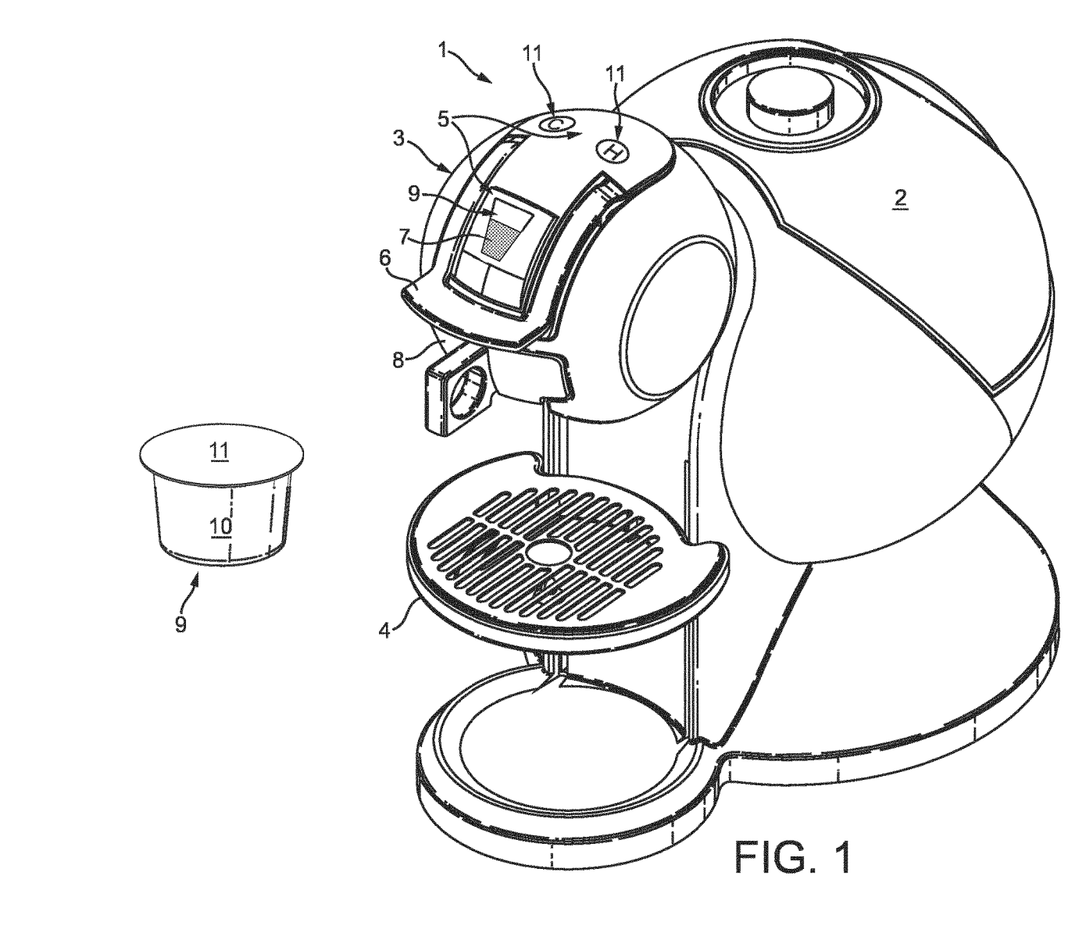
FIG. 1 is a schematic perspective view of a beverage preparation system according to the invention.

The present invention concerns a beverage preparation machine 1 as illustrated in FIG. 1. Such a beverage preparation machine comprises a base having a reservoir 2, a brewing head 3, a cup tray 4 for holding a cup below the brewing head 3 and wherein the prepared beverage flows. The beverage preparation machine further comprises a control panel 5 for setting working parameters of the machine (e.g. volume of beverage to be dispensed, pressure of the fluid to be injected inside the capsule, temperature of the beverage, etc.).

The beverage preparation machine further comprises a handle 6 for opening and closing the brewing head, respectively in configurations for receiving a capsule and for preparing a beverage (closed brewing head in functional configuration). It also comprises a display 7 for displaying information to the user about the machine settings, progression of the beverage preparation, etc. Also, the machine 1 comprises a capsule holder 8 for holding a capsule 9. Said capsule holder is adapted to be removably introduced in a specific recess of the brewing head 3. In FIG. 1, the capsule holder is shown in place within the brewing head.

A capsule 9 for use in the beverage preparation machine 1 is also illustrated in FIG. 1. It comprises a body with side walls 10, and a top membrane 11. The capsule side walls 10 are rigid or semi-rigid thermoplastic material, and the top membrane 11 is made of a monolayer or multilayer thermoplastic material that is sufficiently thin to be pierceable by a fluid injection needle located in the brewing head of the machine 1.

According to the invention, the capsule holder 8 comprises a feature to release residual pressure inside the capsule after the beverage has been dispensed therefrom and before the brewing head is opened by the user.

In a particular embodiment of the invention, the beverage preparation machine can comprise a safety locking means that prevents opening of the brewing head 3 if the pressure inside the capsule is sensed and measured to be above a certain predetermined value, or above the atmospheric pressure. Such a locking means can comprise a pressure sensing means that is linked to the fluid system and fluid injection needle of the machine, so that the pressure inside the capsule can be measured after the beverage has been dispensed and while the injection needle of the machine still protrudes within the capsule.

Figure 2:
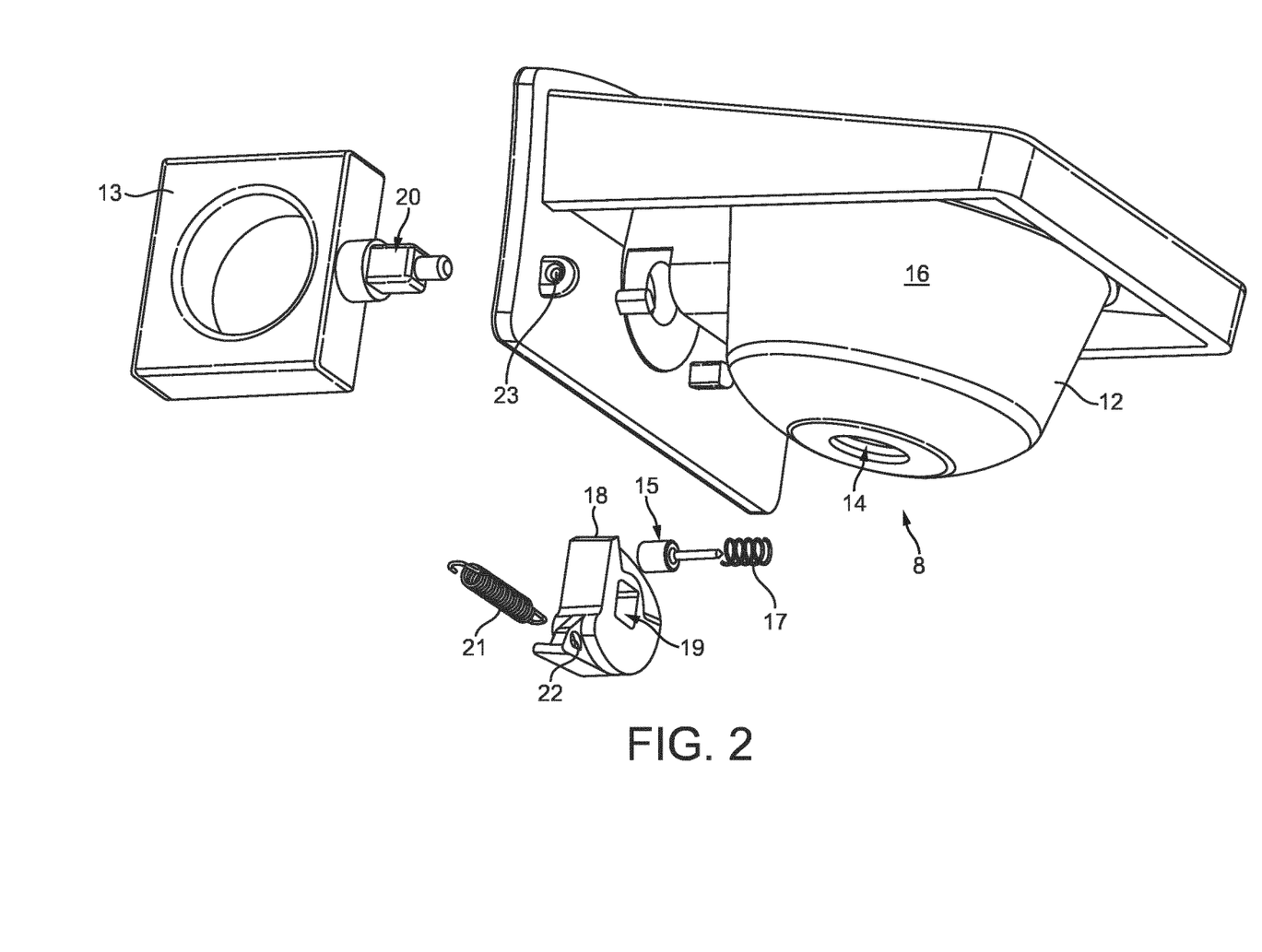
FIG. 2 is a schematic perspective expanded view of a capsule holder according to the present invention.

As illustrated in FIG. 2, the capsule holder according to the invention comprises a cup-shaped body 12 and a handle 13. The cup-shaped body is suitable for holding a capsule therein, and comprises a dispensing hole 14 at the bottom, through which the dispensing outlet of the capsule can protrude and through which the beverage prepared within the capsule is dispensed. The handle 13 is pivotally mounted into an opening of the cup-shaped body 12, as shown in FIGS. 2, 4 and 6.

Figure 3A:
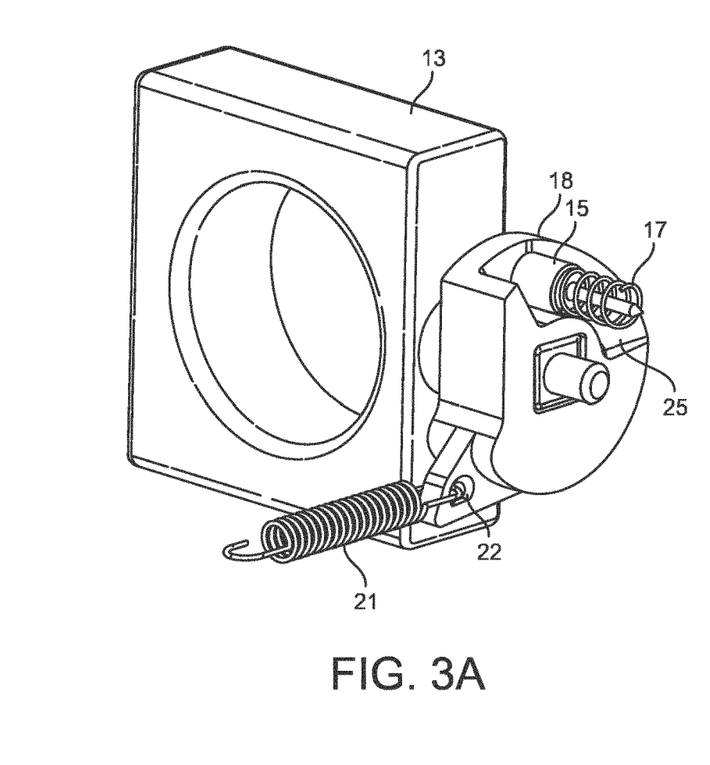
FIG. 3A is a schematic perspective view of the handle and fluid releasing means in the retracted position.
Figure 3B:
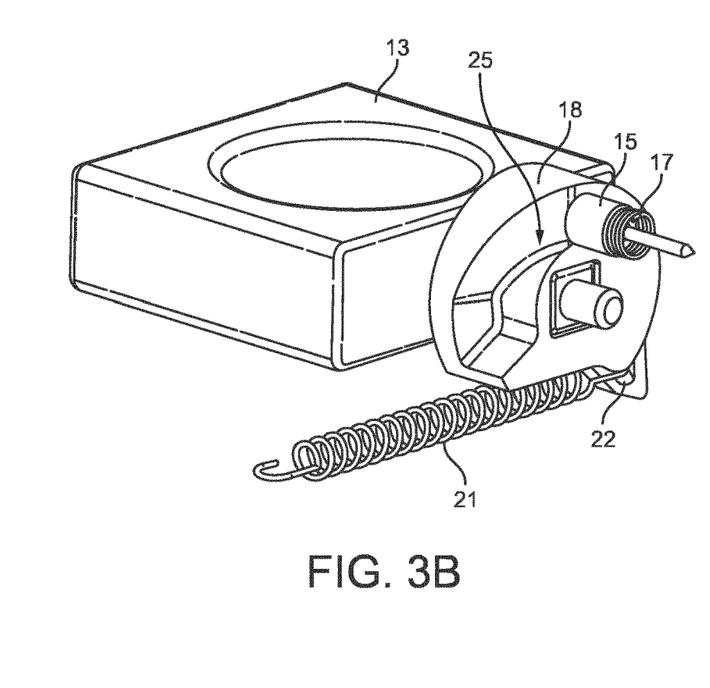
FIG. 3B is a view similar to FIG. 3A with the handle rotated and the fluid releasing means in the extended position.
Figure 4:
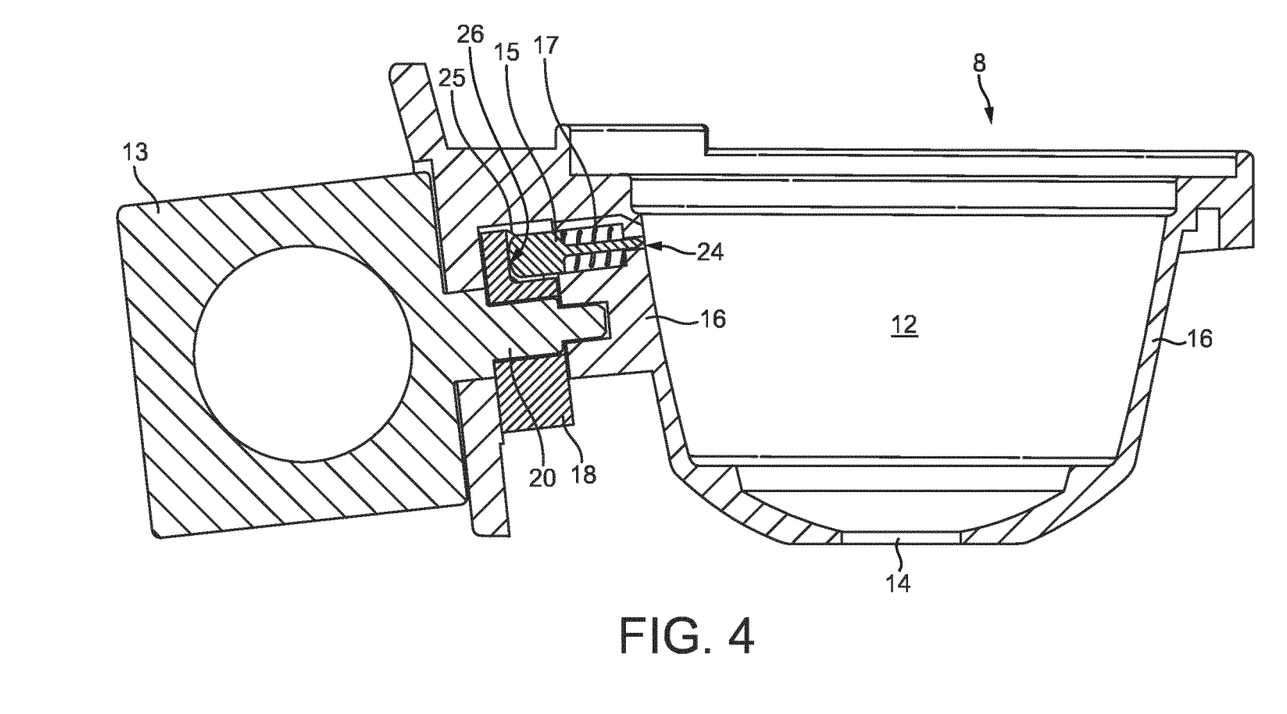
FIG. 4 is a schematic side view of a capsule holder according to the invention with the fluid releasing means in the retracted position.
Figure 6:
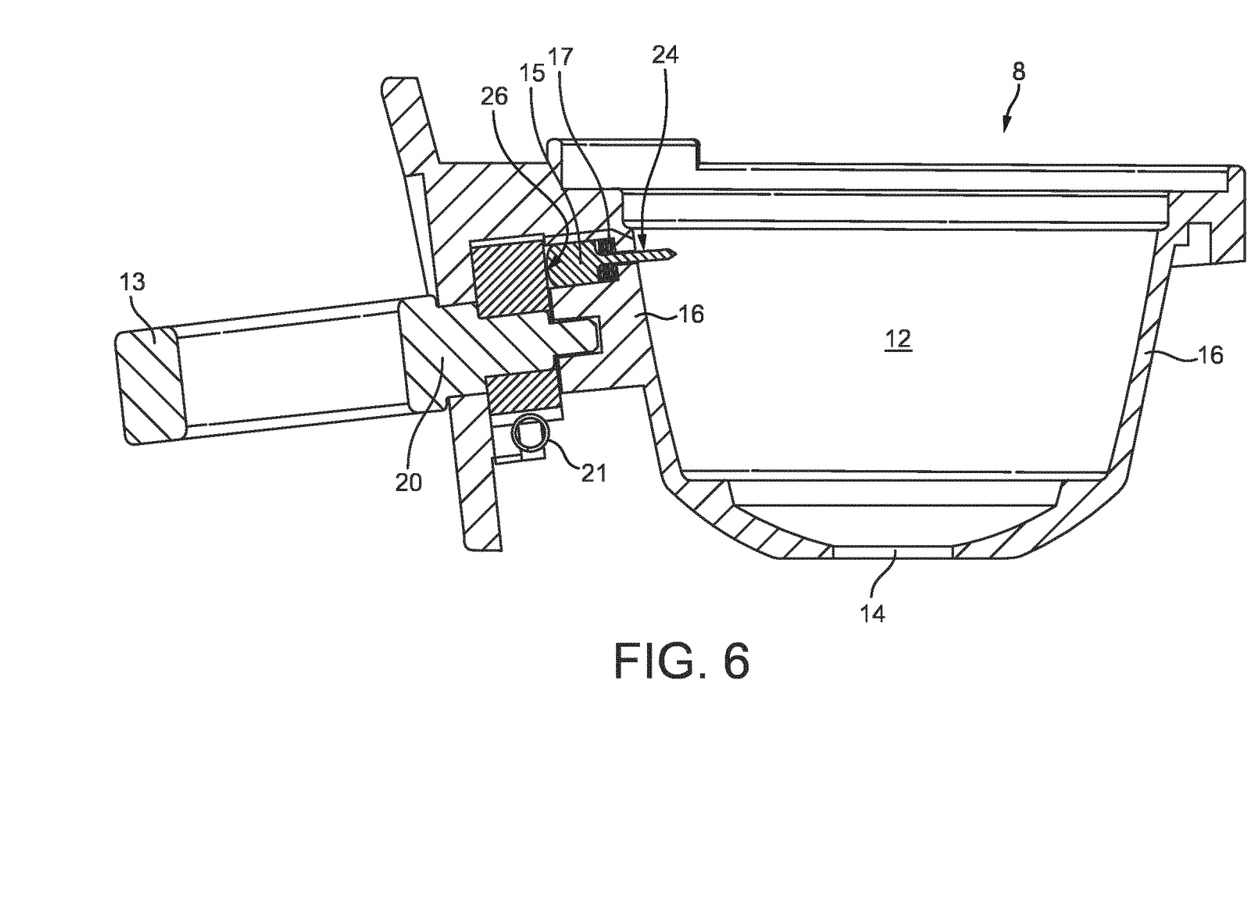
FIG. 6 is a view similar to FIG. 4, with that handle turned and the fluid-releasing means in the extended position.

As shown in FIG. 2, the pressure-releasing means of the capsule holder comprises:

piercing means in the form of a pin element 15 which is directed substantially orthogonally relative to the surface of the capsule holder side walls 16 as illustrated in FIG. 2, 4 or 6; furthermore said pin element 15 is located adjacent to said side wall; the pin element 15 is movable along its longitudinal axis as will be explained in the following description; the pin element is spring mounted relative to the side wall 16 of the capsule holder body 12, with a spring 17 located between the pin head and the external surface of the capsule holder body side wall 16, as shown in FIGS. 4 and 6; the spring 17 ensures that the pin element 15 moves back to its retracted position from the capsule holder body when the handle 13 is not rotated (i.e. when said handle 13 is positioned vertically as illustrated in FIGS. 3A or 4), a cam element 18 that links functionally the piercing means 15 to the handle 13; the cam element 18 can be integrally moulded with the handle 13, or alternatively as illustrated in FIG. 2, it can be a separate element that is mounted onto said handle so as to be functionally linked with said handle 13—for instance as illustrated in FIGS. 2, 3A, and 3B, the cam element 18 comprises a central square bore 19 which is dimensioned to be mounted on a square axis 20 of the handle 13, such that when the handle is rotated relative to the cup-shaped body 12 of the capsule holder, the cam element 18 rotates as well—. The cam element 18 is spring-mounted, such that when no force is applied to the handle 13, the pin element 15 is in its retracted position, and the handle 13 is directed vertically, as illustrated in FIGS. 2 and 3A. A return spring 21 links a first link point 22 of the cam element 18 to a second link point 23 of the capsule holder body 12.

The pin element 15 comprises a sharp distal end which is sufficiently thin and point shape to puncture the plastic wall of a capsule, having a thickness below 2 mm.

The pin element 15 is movably linked to the rotationally movable handle 13 through the cam element attached to, or integrally formed with, said handle, such that said pin element is slidable substantially perpendicularly (or orthogonally) relative to the capsule side wall surface when a rotation movement is applied to said handle. More precisely, the pin element 15 is movable between two positions, as follows.

Figure 5:
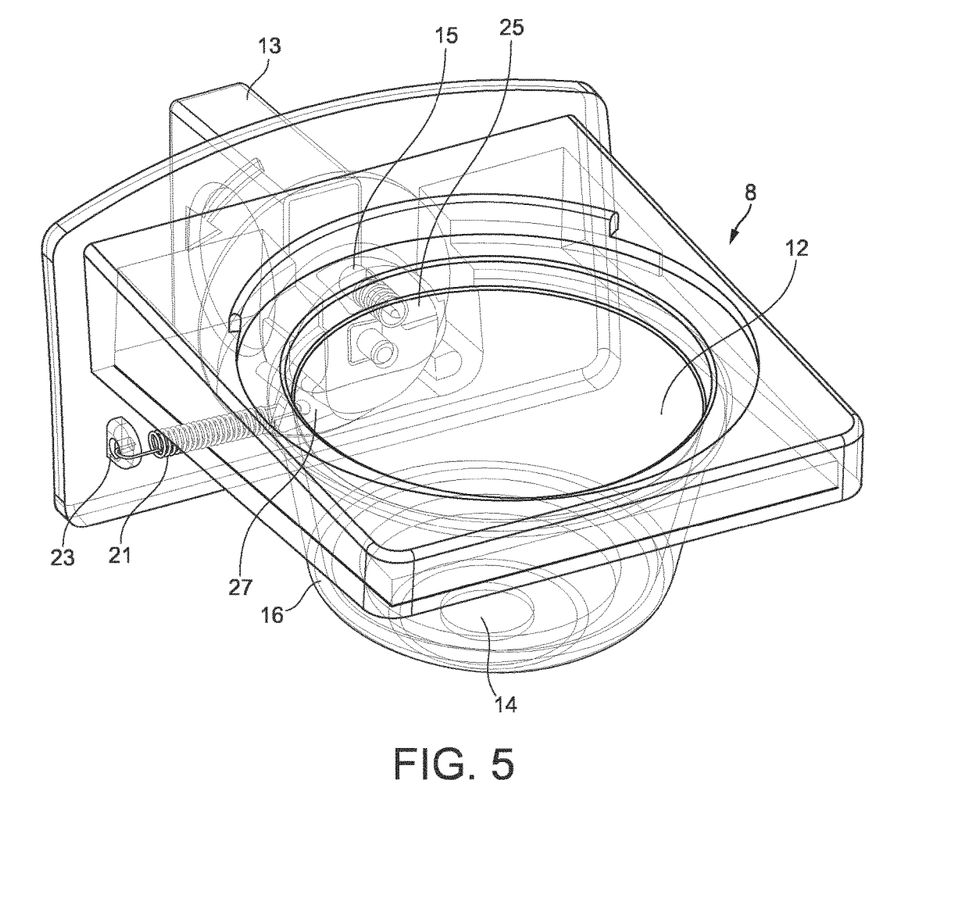
FIG. 5 is a schematic perspective partially cut view of a capsule holder according to the invention with the fluid releasing means in the retracted position.

In a retracted position, said pin element 15 does not protrude from the internal surface of the cup-shaped body side wall 16; in this position the handle 13 is positioned vertically, the spring 17 is in a relaxed state as illustrated in FIGS. 3A or 4 and the return spring 21 of the cam element 18 is compressed as shown in FIGS. 3A or 5.

Figure 8A:
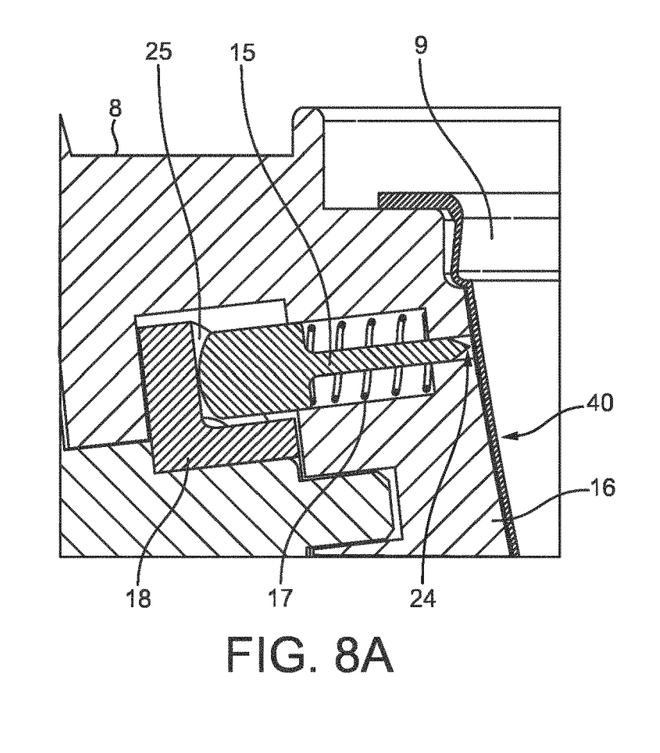
FIG. 8A is an enlarged view of a fluid-releasing means in a capsule holder according to the invention, said fluid releasing means being in the retracted position.
Figure 8B:
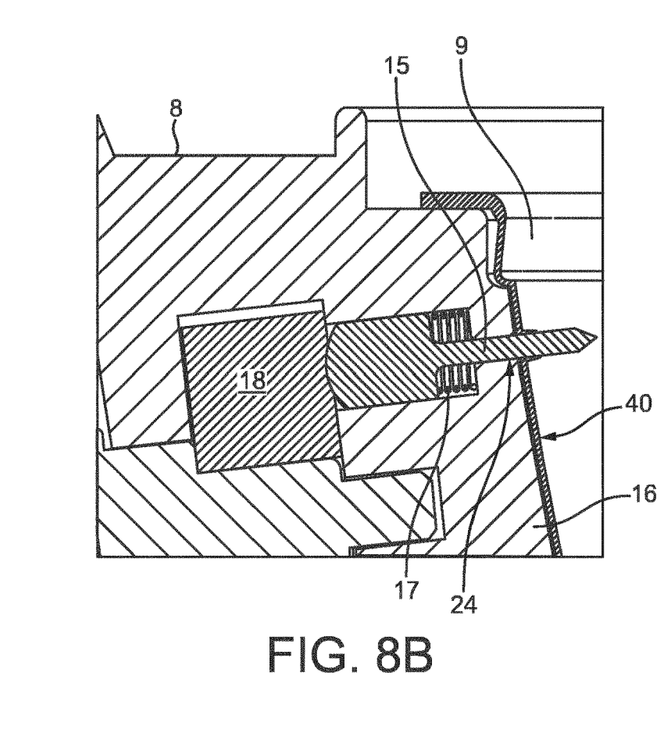
FIG. 8B is an enlarged view of a fluid-releasing means in a capsule holder according to the invention, said fluid releasing means being in the extended position.

When a rotation force is applied to the handle 13 by a user so as to rotate said handle 13 from its vertical position to an horizontal position as shown in FIGS. 3B, 6, to or 10, the pin element 15 is moved through action of the cam element 18 towards the centre of the cup-shaped body 12 of the capsule holder, such that it protrudes through a channel 24 running through the internal surface of the cup-shaped body side wall 16 as illustrated in FIG. 6 or 8B. In this position, the pin element 15 is able to perforate the side wall of capsule 9, as shown in FIG. 8B or in FIG. 10.

The cam element 18 comprises a cam path 25 along which the proximal end 26 of the pin element 15 can slide, as shown for instance in FIGS. 3A and 3B.

Alternatively to rotating handle, handle 13 can be like a push button, which is spring mounted to a normal position wherein the pin 15 is retracted. In such a configuration, the cam element is not needed, which is replaced by a spring coaxially mounted with the pin element, which presses between the handle 13 and the cup-shaped body 12.

The present invention also concerns a process for preparing a beverage with a beverage preparation machine as described previously. The process according to the invention comprises, in order, the steps as follows.

The first step is placing an ingredient-containing capsule 9 in a capsule holder 8 according to the invention, as described here before.

Then the user places the capsule holder 8 loaded with the capsule 9 into the brewing head of the beverage preparation machine, and closes the brewing head by sliding the handle 6 downwards, as illustrated for instance in FIG. 1.

Figure 9:
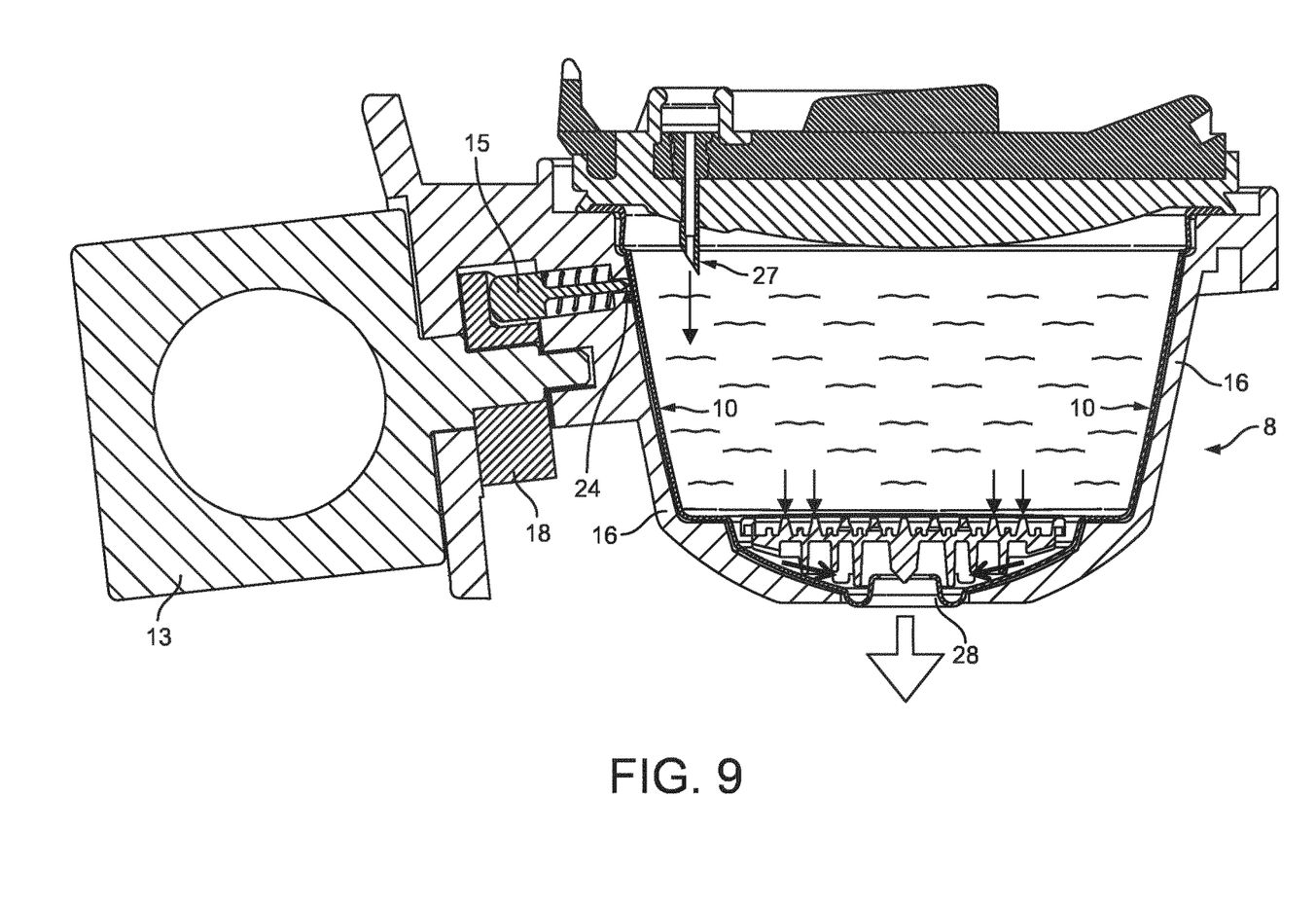
FIG. 9 is a schematic cut side view showing the fluid flowpath during injection of a fluid by the beverage preparation machine into the ingredient capsule.

Then, the user actuates the machine, using for instance the control panel 5, thereby operating said machine 1 such that fluid is injected under pressure inside the capsule 9, through a channel pierced through the top membrane 11 of the capsule by the fluid injection needle 27 of the machine, as illustrated in FIG. 9. The flowpath of the injected fluid through, and then out of the capsule, is indicated with arrows. The injected fluid is mixed with the ingredient contained in the capsule to prepare a beverage, and the fluid pressure built up inside the capsule by injecting the fluid, triggers the opening of the capsule at its dispensing end 28, into a receiving container like a cup (not illustrated in the drawing). Once the beverage volume has been dispensed, the machine fluid pump stops injecting fluid within the capsule, and the capsule dispensing opening closes so that no dripping occurs in the final container (cup).

Figure 10:
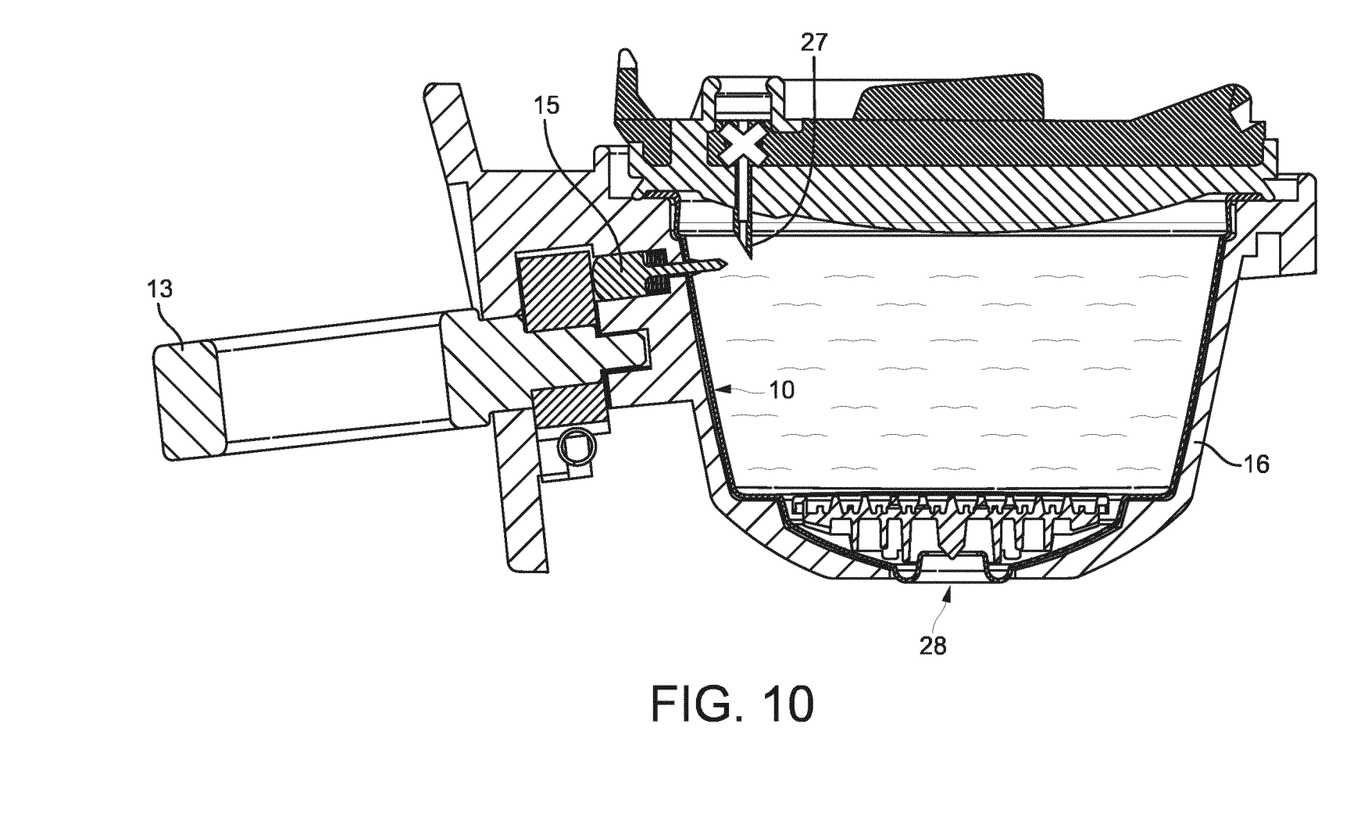
FIG. 10 is a schematic cut side view showing the fluid level inside the capsule after the beverage is dispensed and before the brewing head of the machine is opened.

After the beverage has been dispensed from the capsule as described above, and the capsule has closed to prevent dripping of product, some liquid remains within the capsule compartment, up to a level which is generally quite close to the top membrane 11 of the capsule, as indicated in dotted lines in FIG. 10.

Figure 7:
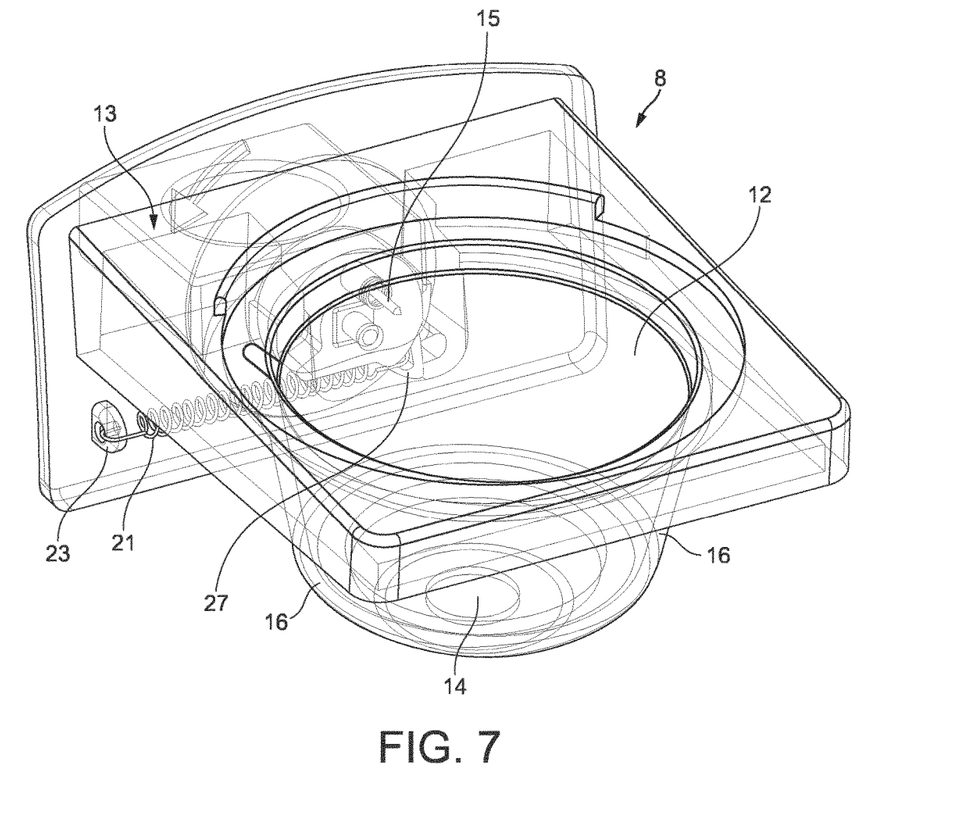
FIG. 7 is a view similar to FIG. 5, with the handle turned and the fluid-releasing means in the extended position.
Figure 11:
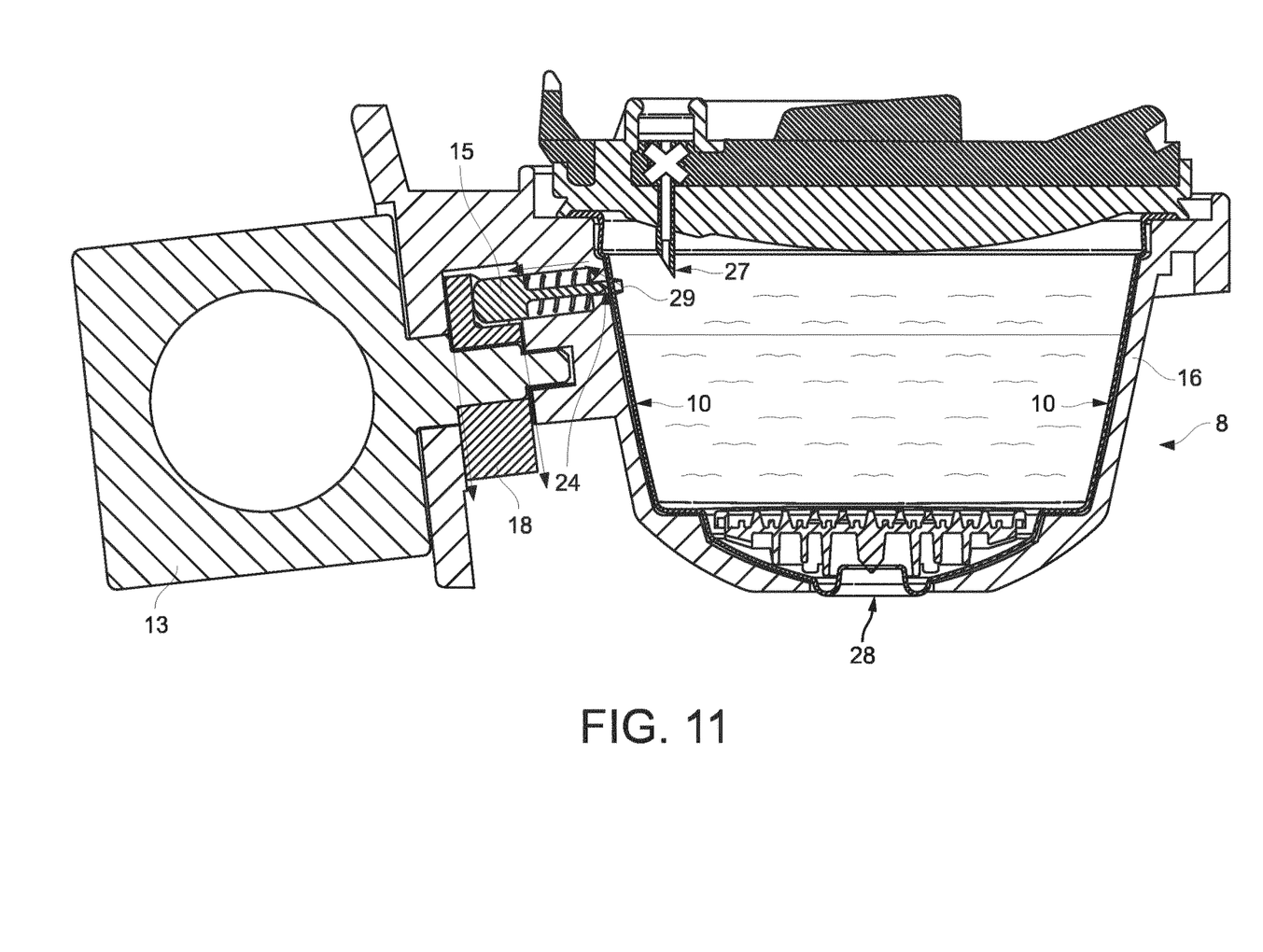
FIG. 11 is a schematic cut side view showing the residual fluid flowing out of the capsule through the channel created by the pressure-releasing means of the capsule holder.

At this point in time, if the user opens the brewing head of the machine by lifting the handle 6 shown in FIG. 1, the residual liquid under pressure within the capsule will flow back through the hole in the top membrane 11 of the capsule that has been pierced by the fluid injection needle 27, and a jet of liquid under pressure will be created ("whale effect") as illustrated in FIG. 12. In order to avoid a whale effect, the present invention allows the consumer to pierce a pressure-releasing channel through the side wall 10 of the capsule 9. To release the pressure, while the capsule 9 is still loaded in the capsule holder 8, and the capsule holder 8 is still within the closed brewing head 3 of the machine 1, the user turns the handle 13 of the capsule holder 8 as indicated in FIG. 7 or in FIG. 10, such that the handle is directed horizontally. As explained above, this moves the pin 15 towards the capsule, which pierces the side wall 10 of said capsule as illustrated in FIG. 10. This creates a communication channel between inside and outside of the capsule. Then, when the user releases the rotating force onto the handle 13, the latter comes back in its normal, vertical position as indicated in FIG. 11, due to the back force applied by the return spring 21. The pin 15 is therefore removed from the capsule 9 and the channel 29 pierced through the capsule side wall 10 is freed which allows residual liquid under pressure within the capsule to flow out through said channel to the outside of the capsule, along a flowpath indicated with dotted arrows in FIG. 11, towards the user's beverage cup which is still positioned below the capsule holder. As shown in FIG. 11, the level of liquid goes down within the capsule, and internal pressure decreases to a pressure equivalent to the atmospheric/ambient pressure.

The user can then open the brewing head and take out the capsule holder and the discard the capsule, without any problem of whale effect.

The invention not only has an impact on the whale effect, but it also provides an improvement for the capsule recyclability (the capsule is not full of liquid when it is thrown away, so there are no problem of full capsule going into the bin).

It has to be noted that the applicant performed experiments with a fast speed camera, which showed that backflow (whale effect) is not only due pressure but also due to capsule being quite full at the end of extraction. Even if the pressure inside the capsule is quite low and similar to atmospheric pressure, the machine head opening motion leads to shaking of capsule, such that product is spilled and gets out from the injection hole of the top membrane.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A capsule holder for holding a closed capsule in a beverage preparation machine, the capsule containing a beverage precursor ingredient, the beverage preparation machine being able to inject a fluid under pressure through a top membrane of the capsule to an inside of the capsule such that the fluid and the precursor ingredient mix to make a beverage, the capsule holder comprising:
   a cup-shaped body adapted to retain and hold the capsule, the cup-shaped body comprises a dispensing hole through a bottom wall of the capsule holder opposite from and co-axial with an opening in the capsule holder through which the capsule is inserted into the capsule holder;
   a rotationally movable handle;
   a guide member for removably inserting the capsule holder within the beverage preparation machine; and
   a pressure-releasing member for releasing fluid pressure inside the capsule, the pressure-releasing member comprising a piercer adapted to pierce at least one channel through a sidewall of the capsule, the piercer comprising a pin element movably linked to the rotationally movable handle through a cam element attached to or integrally formed with the rotationally movable handle, such that the pin element is slidable substantially perpendicular relative to a capsule sidewall surface when a rotation movement is applied to the rotationally movable handle, and the pin element movable through a first internal surface of the cup-shaped body between (i) a retracted position wherein the pin element does not protrude from the first internal surface of the cup-shaped body of the capsule holder and (ii) an extended position wherein the pin element protrudes from the first internal surface of the cup-shaped body to be able to perforate the at least one channel through the sidewall of the capsule, the pin element is perpendicular to the first internal surface, the cup-shaped body further comprises a second internal surface that together with the first internal surface defines part of a compartment in the cup-shaped body that receives the capsule, the dispensing hole opens into the compartment through the second internal surface, the first internal surface is located below a top of the capsule holder, the first internal surface is adjacent to the sidewall of the capsule in the retracted position and the extended position of the pin element, and the second internal surface is adjacent to a bottom end of the capsule in the retracted position and the extended position of the pin element.

2. The capsule holder of claim 1, wherein the pressure-releasing member is automated and actuated by the beverage preparation machine.

3. The capsule holder of claim 1, wherein the pressure-releasing member is manually operated by a user.

4. The capsule holder of claim 1, wherein the cam element is spring-mounted, such that when no force is applied to the rotationally movable handle, the pin element is in the retracted position.

5. The capsule holder of claim 1, wherein the piercer is located adjacent to the sidewall of the capsule.

6. The capsule holder of claim 1, further comprising a spring that abuts an external surface of a side wall of the cup-shaped body and biases the pin element toward the retracted position.

7. The capsule holder of claim 1, wherein the dispensing hole is configured to (a) open when the beverage preparation machine injects the fluid to the inside of the capsule and (b) close when the beverage preparation machine stops injecting the fluid.

* * * * *